(12) United States Patent
Schein

(10) Patent No.: US 10,630,154 B2
(45) Date of Patent: Apr. 21, 2020

(54) METHOD FOR WINDING A PLURALITY OF COIL BODIES AND SEGMENTED SPINDLE

(71) Applicant: CONTINENTAL AUTOMOTIVE GMBH, Hannover (DE)

(72) Inventor: Uwe Schein, Kaufungen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/451,607

(22) Filed: Mar. 7, 2017

(65) Prior Publication Data

US 2017/0179799 A1    Jun. 22, 2017

Related U.S. Application Data

(63) Continuation of application No. PCT/EP2015/070983, filed on Sep. 14, 2015.

(30) Foreign Application Priority Data

Sep. 16, 2014   (DE) .................. 10 2014 218 602

(51) Int. Cl.
| | | |
|---|---|---|
| *H02K 15/095* | (2006.01) | |
| *H02K 15/04* | (2006.01) | |
| *H02K 3/18* | (2006.01) | |

(52) U.S. Cl.
CPC ............. *H02K 15/095* (2013.01); *H02K 3/18* (2013.01); *H02K 15/0442* (2013.01)

(58) Field of Classification Search
CPC ...... H02K 15/045; H02K 15/095; H02K 3/18; H02K 3/02; H02K 3/028; H02K 16/04; B29C 53/828

USPC ....................................................... 242/433.1
See application file for complete search history.

(56) References Cited

U.S. PATENT DOCUMENTS

| 1,955,763 | A | * | 4/1934 | Saltzman | ............... B21C 47/006 |
|---|---|---|---|---|---|
| | | | | | 242/444.5 |
| 2,257,837 | A | * | 10/1941 | Burge | ................... H01F 41/068 |
| | | | | | 242/128 |
| 2,925,227 | A | * | 2/1960 | Hann | ..................... B65H 54/22 |
| | | | | | 242/125.1 |

(Continued)

FOREIGN PATENT DOCUMENTS

| CN | 101557130 A | 10/2009 |
|---|---|---|
| DE | 10 2005 001 705 A1 | 1/2006 |

(Continued)

OTHER PUBLICATIONS

International Search Report and Written Opinion dated Jan. 5, 2016 from corresponding International Patent Application No. PCT/EP2015/070983.

(Continued)

*Primary Examiner* — Emmanuel M Marcelo

(57) ABSTRACT

A method for winding a plurality of coil bodies for the production of electric motors using a segmented spindle. According to the method, a number of coil bodies are coupled to at least one intermediate part and two end parts to form a segmented spindle, and the segmented spindle is arranged in/on a winding machine. In this way, the coil bodies are wound in a synchronized manner. As a result, only a rotatable spindle is required for the winding of a number of coil bodies.

7 Claims, 2 Drawing Sheets

(56) References Cited

U.S. PATENT DOCUMENTS

| | | | | | |
|---|---|---|---|---|---|
| 3,003,453 | A | * | 10/1961 | Jamieson | B63B 35/816 114/254 |
| 3,167,853 | A | * | 2/1965 | Farmer | H02K 15/09 242/433.1 |
| 3,337,145 | A | * | 8/1967 | Keck | B65H 54/22 242/129.51 |
| 3,692,250 | A | * | 9/1972 | Lee | H01F 41/068 242/444.5 |
| 4,139,165 | A | * | 2/1979 | Dyck | B65H 18/103 242/421 |
| 4,584,506 | A | * | 4/1986 | Kaszmann | H02P 25/089 318/400.26 |
| 4,722,486 | A | * | 2/1988 | Camardella | B65H 67/048 140/92.2 |
| 4,987,673 | A | | 1/1991 | Kogura et al. | |
| 6,029,925 | A | * | 2/2000 | Yano | H02K 15/08 242/440.1 |
| 6,400,059 | B1 | | 6/2002 | Hsu | |
| 2002/0050541 | A1 | * | 5/2002 | Akita | H02K 15/095 242/348 |
| 2003/0030345 | A1 | | 2/2003 | Enomoto et al. | |
| 2003/0222531 | A1 | * | 12/2003 | Akutsu | G01D 5/2046 310/216.074 |
| 2007/0182271 | A1 | | 8/2007 | Sugishima et al. | |
| 2012/0126050 | A1 | * | 5/2012 | Land | B65H 54/20 242/474.8 |

FOREIGN PATENT DOCUMENTS

| | | |
|---|---|---|
| DE | 10 2007 006 095 A1 | 8/2007 |
| EP | 1 684 399 A2 | 7/2006 |
| EP | 1 843 447 A1 | 10/2007 |
| EP | 2 048 768 A2 | 4/2009 |
| JP | S62151724 U | 9/1987 |
| JP | H03-138 918 A | 6/1991 |
| JP | 2892225 B2 | 5/1999 |
| JP | 2002064962 A | 2/2002 |
| JP | 2006340576 A | 12/2006 |
| JP | 2009 153334 A | 7/2009 |
| KR | 20060031177 A | 4/2006 |
| WO | 2005/004311 A1 | 1/2005 |

OTHER PUBLICATIONS

Deutsches Patent Office Action dated May 8, 2015 from the corresponding German Patent Application No. 10 2014 218 602.1.

* cited by examiner

METHOD FOR WINDING A PLURALITY OF COIL BODIES AND SEGMENTED SPINDLE

CROSS-REFERENCE TO RELATED APPLICATIONS

This application claims the benefit of PCT Application PCT/EP2015/070983, filed Sep. 14, 2015, which claims priority to German Application DE 10 2014 218 602.1, filed Sep. 16, 2014. The disclosures of the above applications are incorporated herein by reference.

FIELD OF THE INVENTION

The present invention relates to a method for winding a multiplicity of coil bodies for the production of electric motors. The invention furthermore relates to a segmented spindle for use in a method of this type.

BACKGROUND OF THE INVENTION

For winding coil bodies it is known for each individual coil body to be chucked to in each case one spindle. The coiling wire is wound onto the coil body by the rotary motion of the spindle. To this end, in mass production either a plurality of coils is sequentially produced or, alternatively, a multiple number of coil bodies are wound by means of a plurality of spindles. A winding machine is employed herein for winding.

Therefore, a plurality of spindles are used in order for a plurality of coil bodies to be wound in a synchronous manner, where one coil body is located on each one of the spindles. This represents significant complexity. Drive spindles of complex design that are very precisely synchronized have to be employed. Furthermore, the complexity in terms of supplying the winding machine is high.

A method for the manufacturing of armatures in which in each case two teeth of an integral part-element of a core are wound is known from DE 10 2005 001 705 A1. The publication therefore does not relate to the winding of individual coil bodies that are attached to one another.

EP 1 684 399 A2 describes a stator in the case of which individual coil bodies are attached to one another, the unit formed is disposed between two clamps of a winding machine and then wound. The coil bodies herein are held together by way of magnetic forces.

EP 2 048 768 A2 describes a stator in the case of which coil bodies and intermediate pieces are attached to one another so as to be in line, and the unit that is formed on account thereof is inserted into a winding machine and wound.

Further methods for winding coil bodies are described in U.S. Pat. No. 3,337,145 A and JP H03-138 918 A, in the case of which methods coil bodies and intermediate pieces are attached to one another, the unit formed being wound in a winding machine.

SUMMARY OF THE INVENTION

The present invention is based on the object of providing a method winding a multiplicity of coil bodies, which is carried out in a particularly simple and cost-effective manner.

This object according to the invention is achieved by a method for winding a multiplicity of coil bodies for the production of electric motors.

In order for a plurality of coils to be simultaneously wound on a single spindle, a first end piece, at least one intermediate piece, a second end piece, and interdisposed coil bodies to be wound are intercoupled such that a spindle that is assembled from individual segments results. For example, if two coil bodies are to be simultaneously wound, a segmented spindle which is assembled from a first end piece, a first coil body, an intermediate body, a second coil body, and a second end piece is established. If a total of three coil bodies are to be simultaneously wound, two end pieces and two intermediate pieces are used between three coil bodies. The segmented spindle that is configured in this way is mounted to a winding machine, where synchronous winding of the coil bodies being performed thereupon.

Therefore, according to the invention, only a single rotatable spindle is required for winding a plurality of coil bodies such that a multiplicity of complex and very precisely synchronized drive spindles may be constructed. The complexity in terms of supplying the winding machine may also be substantially reduced.

The end pieces include shaft stubs for receiving in/on the spindle drive of the winding machine and are preferably used in the case of the method according to the invention. The drive of the segmented spindle may be tooled and established in a simple and rapid manner in this way.

Furthermore, an intermediate piece having an integrated bearing point is preferably used for supporting the segmented spindle in the case of the method according to the invention. The intermediate pieces are therefore preferably provided with bearing points such that the segmented spindle may be supported during operation, so as to prevent sagging. These bearing points in the intermediate pieces of the segmented spindle may be simultaneously used for receiving the cable pulls in the winding machine.

The end pieces, the at least one intermediate piece, and the coil bodies that are coupled to the former, are interconnected in a form-fitting manner, specifically by way of plug connections. The end pieces, the at least one intermediate piece, and the coil bodies herein by way of undercuts are fixed to one another. Such a segmented spindle is established very rapidly by connecting the elements by way of the plug connections. The plug connections of this type ensure reliable coupling of the components which is not compromised by the rotation of the spindle.

Coil bodies that are configured in a conventional way or are newly conceived may be used in the case of the method according to the invention. The two lateral flanges of a coil body herein are disposed in respective matching clearances in the end pieces or the intermediate pieces, the clearances being configured to include undercuts such that the coil body cannot be removed from the intermediate piece or the end piece, respectively, in the axial direction but must be inserted into the end or intermediate pieces in an upward or downward manner, i.e. perpendicular to the spindle axis and removed again after each coil body is wound.

In one embodiment, the integrated bearing points have a smaller width than the remaining intermediate piece, and in yet another embodiment, the integrated bearing points may be approximately the same width as the provided shaft stubs.

The method according to the invention, for example, is suitable for coil bodies which have an elongated cross-sectional shape, and are configured so as to be approximately rectangular in the interior.

The coils are applied to the coil bodies in a conventional winding machine by rotation of the segmented spindle and a relative motion of the wire guide, for example. Specially conceived winding machines may of course also be used for carrying out the method according to the invention.

The present invention furthermore relates to a segmented spindle for use in the method described above. The segmented spindle is assembled from a first end piece, a second end piece, at least one intermediate piece, and interdisposed coil bodies that are wound or to be wound.

The two end pieces provide the drive connection of the segmented spindle and preferably have respective portions for receiving in/on the spindle drive on a winding machine, where these portions may be configured as shaft stubs, for example.

The intermediate pieces act as spacers between the individual coil bodies, and the intermediate pieces preferably have at least one integrated bearing point by means of which the segmented spindle may be supported.

Both the end pieces as well as the intermediate pieces are configured such that a rapid and simple form-fitting connection to the interdisposed coil bodies is possible. These here are plug connections which are implemented by means of clearances having undercuts in the end pieces and/or intermediate pieces. As has already been mentioned, the coil bodies herein are pushed-fitted from above or below into the respective clearances of the end pieces and intermediate pieces, while axial coupling or coupling by way of lateral push-fitting is precluded.

Such a segmented spindle or segment-based spindle is thus established in a rapid and simple manner by alternatingly coupling end/intermediate pieces and coil bodies, and the coil bodies that form part of the spindle may be readily wound in a simultaneous manner. The coil bodies are removed upon termination of the winding procedure, for example in an upward or downward manner.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
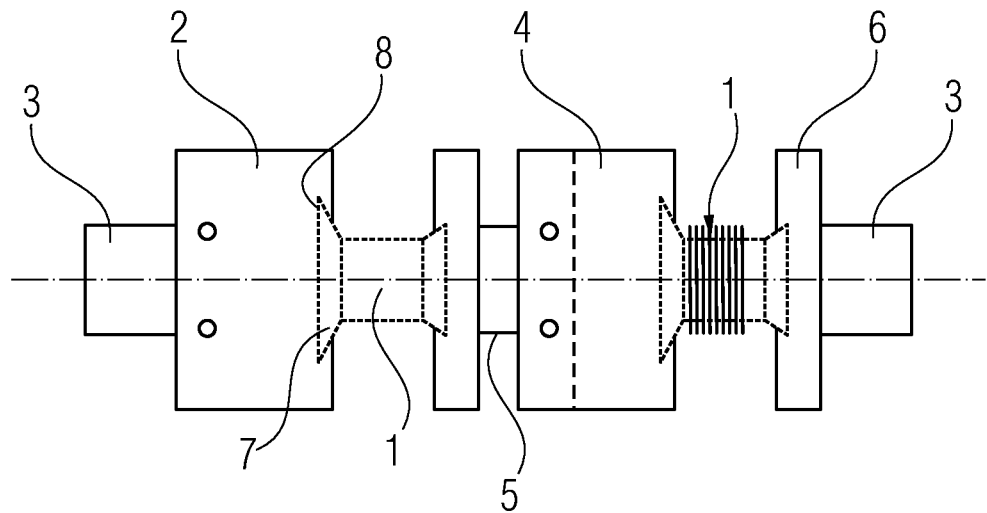
FIG. 1 is a plan view of an exemplary embodiment of a segmented spindle.
Figure 2:
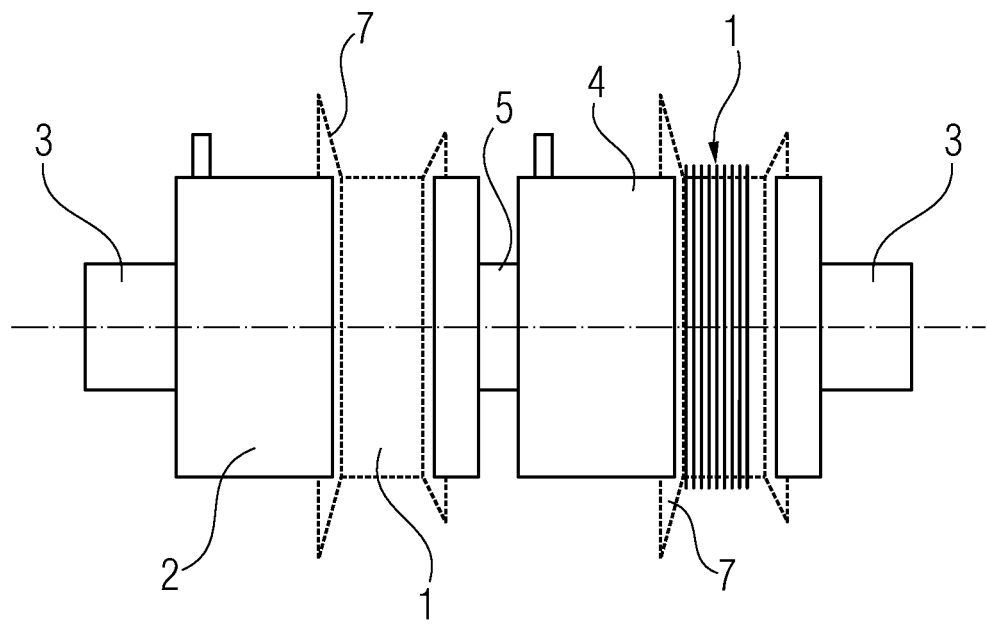
FIG. 2 is a front view of the segmented spindle of FIG. 1.

The segmented spindle that is illustrated in the view from above in FIG. 1 and in the view from the front in FIG. 2 is assembled from a first end piece 2 (illustrated on the left in the figure), a coil body 1, an intermediate piece 4, a coil body 1, and a second end piece 6 (illustrated on the right in the figure). Both end pieces are each provided with one shaft stub 3, so as to establish a connection to a winding-machine drive.

The intermediate piece 4 has a region 5 that is narrower and serves as a bearing point, serving for supporting the spindle in the winding procedure. The coil bodies 1 are configured in a conventional way, each having one lateral flange 7 which is disposed in a clearance 8 in the end piece 2 and in the intermediate piece 4, the clearance 8 having undercuts. Moreover, the coil body 1 in the front view has an approximately rectangular shape.

In order for a synchronous winding procedure of a plurality of coil bodies 1 to be carried out, the latter are coupled to the end pieces 2 and 6 and to the intermediate piece 4. This is performed in that the coil bodies 1 are push-fitted from above into the respective clearances 8 in the end pieces and the intermediate piece 4. Once the segmented spindle has been completed in this way, the latter is inserted into a winding machine and the respective shaft stubs 3 are connected to the drive of the winding machine. The spindle is then rotated so as to wind the two coil bodies 1 in a synchronous manner. After the winding procedure has been terminated the wound coil bodies are removed from the segmented spindle again.

FIG. 2 shows the segmented spindle of FIG. 1 in the front view.

Figure 3:
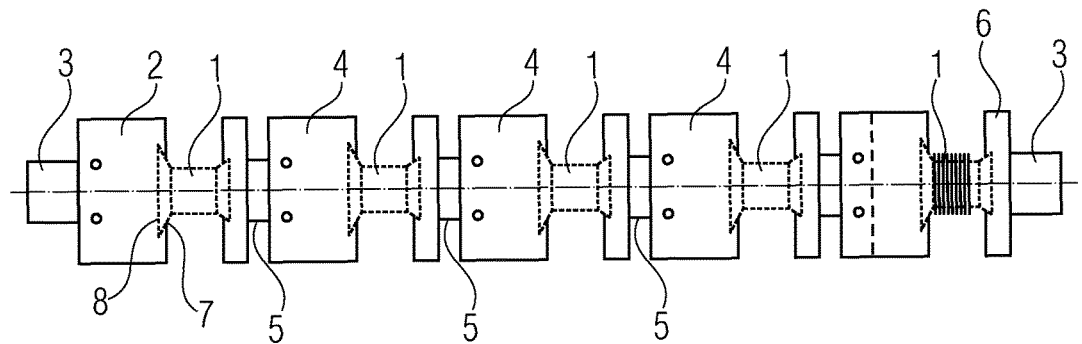
FIG. 3 is a plan view of an exemplary embodiment of a segmented spindle having a total of five coil bodies.

A view from above of a segmented spindle is shown in FIG. 3, where the segmented spindle has a construction that corresponds to that of FIG. 1, wherein however five coil bodies 1 are provided here for winding. Here too, the coil bodies 1 are inserted into undercut clearances 8 of the end pieces 2 and intermediate pieces 4, so as to carry out a synchronous winding procedure.

Figure 4:
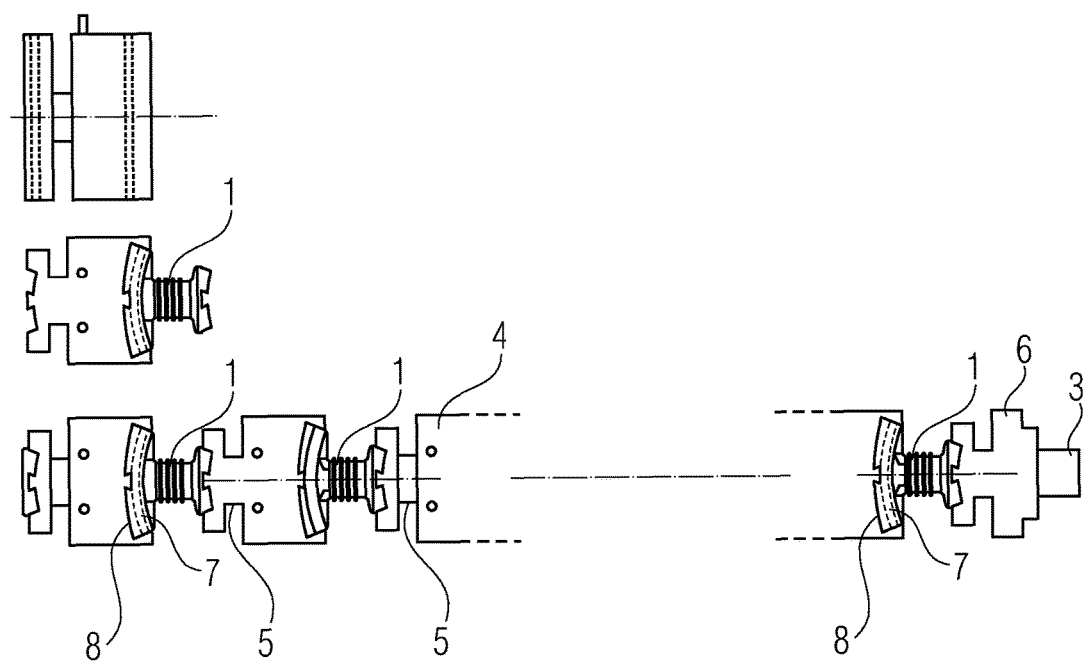
FIG. 4 is a plan view of a further exemplary embodiment of a segmented spindle.

The embodiment of a segmented spindle shown in FIG. 4 differs from that of FIGS. 1 to 3. It is seen in the illustrated view from above that coil bodies 1 of a different configuration are used herein, the coil bodies 1 having bent end flanges 7 which are disposed in adapted clearances 8 of the end pieces and intermediate pieces. The intermediate pieces illustrated here also have regions 5 that are narrower and serve as bearing points for supporting the rotating segmented spindle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for winding a multiplicity of coil bodies for the production of electric motors, comprising the following steps:
   providing a segmented spindle;
   providing a first end piece, the first end piece being part of the segmented spindle;
   providing at least one intermediate piece, the at least one intermediate piece being part of the segmented spindle;
   providing a second piece, the second piece being part of the segmented spindle;
   providing a plurality of coil bodies;
   providing a winding machine; and
   providing a plurality of undercuts, at least one of the plurality of undercuts formed as part of the first end piece, another of the plurality of undercuts formed as part of the second end piece, and two of the plurality of undercuts formed as part of the at least one intermediate piece;
   assembling the segmented spindle by connecting one of the plurality of coil bodies to the first end piece and the intermediate piece, and connecting another of the coil bodies to the intermediate piece and the second piece;
   mounting the segmented spindle to the winding machine;
   winding the coil bodies synchronously;
   connecting one of the plurality of coil bodies in an upward and downward manner to the first end piece and the intermediate piece using the at least one of the plurality of undercuts formed as part of the first end piece and one of the plurality of undercuts formed as part of the intermediate piece;

connecting another of the coil bodies in an upward and downward manner to the intermediate piece and the second piece using the undercut formed as part of the second end piece and the other of the undercuts formed as part of the intermediate piece;

removing the plurality of coil bodies from the segmented spindle in a wound state.

2. The method of claim 1, further comprising the steps of:

providing a plurality of stub shafts, at least one of the plurality of stub shafts formed as part of the first end piece, and another of the plurality of stub shafts formed as part of the second end piece;

providing a spindle drive, the spindle drive being part of the winding machine;

mounting the segmented spindle to the winding machine by connecting the shaft stubs to the spindle drive.

3. The method of claim 1, further comprising the steps of:

providing an integrated bearing point formed as part of the at least one intermediate piece;

supporting the segmented spindle using the integrated bearing point.

4. The method of claim 1, further comprising the steps of:

providing a plurality of coils; and providing a wire guide, the wire guide being part of the winding machine;

rotating the segmented spindle relative to the wire guide such that each one of the plurality of coils is wound onto a corresponding one of the coil bodies.

5. A segmented spindle, comprising:

a first end piece;

a second end piece;

at least one intermediate piece;

a plurality of coil bodies; and a plurality of undercuts, at least one of the plurality of undercuts formed as part of the first end piece, another of the plurality of undercuts formed as part of the second end piece, and at least two of the plurality of undercuts formed as part of the at least one intermediate piece;

wherein one of the plurality of coil bodies is connected to the first end piece and the at least one intermediate piece in an upward and downward manner using the at least one of the plurality of undercuts formed as part of the first end piece and one of the plurality of undercuts formed as part of the intermediate piece, and another of the coil bodies is connected to the second end piece and the intermediate piece in an upward and downward manner using the undercut formed as part of the second end piece and the other of the undercuts formed as part of the intermediate piece, and the plurality of coil bodies are removed from the segmented spindle in a wound state.

6. The segmented spindle of claim 5, further comprising:

a plurality of stub shafts, at least one of the plurality of stub shafts formed as part of the first end piece, and another of the plurality of stub shafts formed as part of the second end piece; and a winding machine having a spindle drive;

wherein the segmented spindle is connected to the winding machine by connecting the plurality of stub shafts to the spindle drive.

7. The segmented spindle of claim 5, further comprising an integrated bearing point formed as part of the at least one intermediate piece, wherein the segmented spindle is supported using the integrated bearing point.

* * * * *